United States Patent [19]

Inoue et al.

[11] Patent Number: 5,786,042
[45] Date of Patent: Jul. 28, 1998

[54] RESIN BLACK MATRIX FOR LIQUID CRYSTAL DISPLAY DEVICE

[75] Inventors: Keijiro Inoue; Fumio Tomita; Tetsuya Goto, all of Shiga, Japan

[73] Assignee: Toray Industries, Inc., Tokyo, Japan

[21] Appl. No.: 638,369

[22] Filed: Apr. 26, 1996

[30] Foreign Application Priority Data

Apr. 28, 1995 [JP] Japan .................................. 7-106567
Apr. 28, 1995 [JP] Japan .................................. 7-106568

[51] Int. Cl.$^6$ .................................................. C09K 19/00
[52] U.S. Cl. .................... 428/1; 359/103; 428/323; 428/473.5
[58] Field of Search ................... 428/1, 473.5, 323; 359/105

[56] References Cited

U.S. PATENT DOCUMENTS

| | | | |
|---|---|---|---|
| 3,519,452 | 7/1970 | Rivia et al. | 106/261 |
| 4,721,740 | 1/1988 | Takeshita et al. | 523/215 |
| 5,251,071 | 10/1993 | Ksukawa | 359/891 |

FOREIGN PATENT DOCUMENTS

| | | |
|---|---|---|
| 0 395 183 A1 | 10/1990 | European Pat. Off. |
| 3118503 A1 | 11/1982 | Germany |

*Primary Examiner*—Nasser Ahmad
*Attorney, Agent, or Firm*—Morrison & Foerster LLP

[57] ABSTRACT

This invention provides a resin black matrix with a light-shading agent dispersed in a resin, comprising the use of carbon black satisfying at least one of the following features of (A) to (D), as said light-shading agent.

(A) 6.5 or less in pH
(B) 0.001<[COOH] in the carboxyl group concentration [COOH] on the surface, as a molar ratio per all carbon atoms
(C) 0.001<[OH] in the hydroxyl group concentration on the surface, as a molar ratio per all carbon atoms
(D) 0.001<[SO$_3$H] in the sulfonic acid group concentration on the surface, as a molar ratio per all carbon atoms The present invention also provides a black paste with a light-shading agent dispersed in a resin or its precursor solution, comprising the use of carbon black satisfying at least one of the above features of (A) to (D) as said light-shading agent.

The third aspect of the present invention is a color filter, comprising said resin black matrix.

The color filter of the present invention is, by using said carbon black, high in light-shadability and can display images with excellent quality when set in liquid crystal display devices.

21 Claims, 1 Drawing Sheet

RESIN BLACK MATRIX FOR LIQUID CRYSTAL DISPLAY DEVICE

FIELD OF THE INVENTION

The present invention relates to a resin black matrix for color filters used in liquid crystal display devices that have high displaying characteristics.

BACKGROUND OF THE INVENTION

Generally, a color filter for liquid crystal display consists of a large number of color triplets, each comprises three color pixels (red, green, and blue), formed on a transparent substrate. To enhance the contrast, light-shading regions of predetermined width (which is called the black matrix because of its black color on the screen) are formed between these pixels.

Most of the conventional color filters use a black matrix produced by the photolithography, which comprise a thin metal film with a fine pattern. The metals used for such black matrixes include Cr, Ni, and Al, and the methods used for producing them include such vacuum film formation methods as sputtering and vacuum deposition. To form a fine pattern, the photolithography is used in most cases to form a pattern on a photoresist, and this photoresist pattern is then used as an etching mask to etch a thin metal film. The thin metal film produced by this process has the same fine pattern as that on the photoresist.

The methods for producing pixels include the dyeing of a dyeable medium formed by the photolithography, the use of a photosensitive pigment dispersed composition, the etching of non-photosensitive pigment dispersed composition, and the electrodeposition using a patterned electrode, as well as such low-cost methods as the formation of colored portions by ink jet or other printers.

OBJECT OF THE INVENTION

However, a black matrix formed as a thin metal film requires large costs for the thin metal film production process, which is responsible for the high prices of color filters. In addition, chromium, which is generally used in the thin metal film for black matrices, is high in reflectance, leading to strong reflection from the chromium face in places where strong sunlight comes in from outside. In particular, the displaying performance may be largely lowered if a color filter is used with a transmission type display device. A method has been proposed wherein a layer of such material as chromium oxide is provided between the chromium face and the light transmittable substrate with the aim of reducing the reflectance of the black matrix. This, however, further increases the cost for the black matrix production, and cannot serve for price reduction.

So, for example, it is proposed to pattern a resin colored with a light-shading agent for forming the black matrix, and then to form pixels for production of color filter. However, compared to the conventional thin metal film, the light-shadability per an unit thickness is still insufficient. So, there is a problem that the back light leaks on the display face through the black matrix in liquid crystal display. For this reason, there is a serious problem that when a black color or a less bright color is displayed, the desired color cannot be displayed. On the other hand, to improve the light-shadability, the thickness of the black matrix can be made lager, but in this case, the color filter is less flat on the surface, to pose a new problem that the image quality is lowered.

The present invention was made to overcome the disadvantages of these techniques. That is, the object of the present invention is to provide a resin black matrix, which is high in light-shadability per an unit thickness and can display images with excellent quality when set in liquid crystal display devices.

SUMMARY OF THE INVENTION

The above object of the present invention can be achieved by the following resin black matrix, the black paste for producing it and the under mentioned color filter for liquid crystal display device.

That is, the first aspect of the present invention is a resin black matrix with a light-shading agent dispersed in a resin, comprising the use of carbon black satisfying at least one of the following features of (A) to (D), as said light-shading agent.

(A) 6.5 or less in pH (B) 0.001<[COOH] in the carboxyl group concentration [COOH] on the surface, as a molar ratio per all carbon atoms (C) 0.001<[OH] in the hydroxyl group concentration [OH] on the surface, as a molar ratio per all carbon atoms (D) 0.001<[SO$_3$H] in the sulfonic acid group concentration [SO$_3$H] on the surface, as a molar ratio per all carbon atoms The second aspect of the present invention is a black paste with a light-shading agent dispersed in a resin or its precursor solution, comprising the use of carbon black satisfying at least one of the above features of (A) to (D) as said light-shading agent. The third aspect of the present invention is a color filter, comprising said resin black matrix.

DETAILED DESCRIPTION OF THE INVENTION

Figure 1:
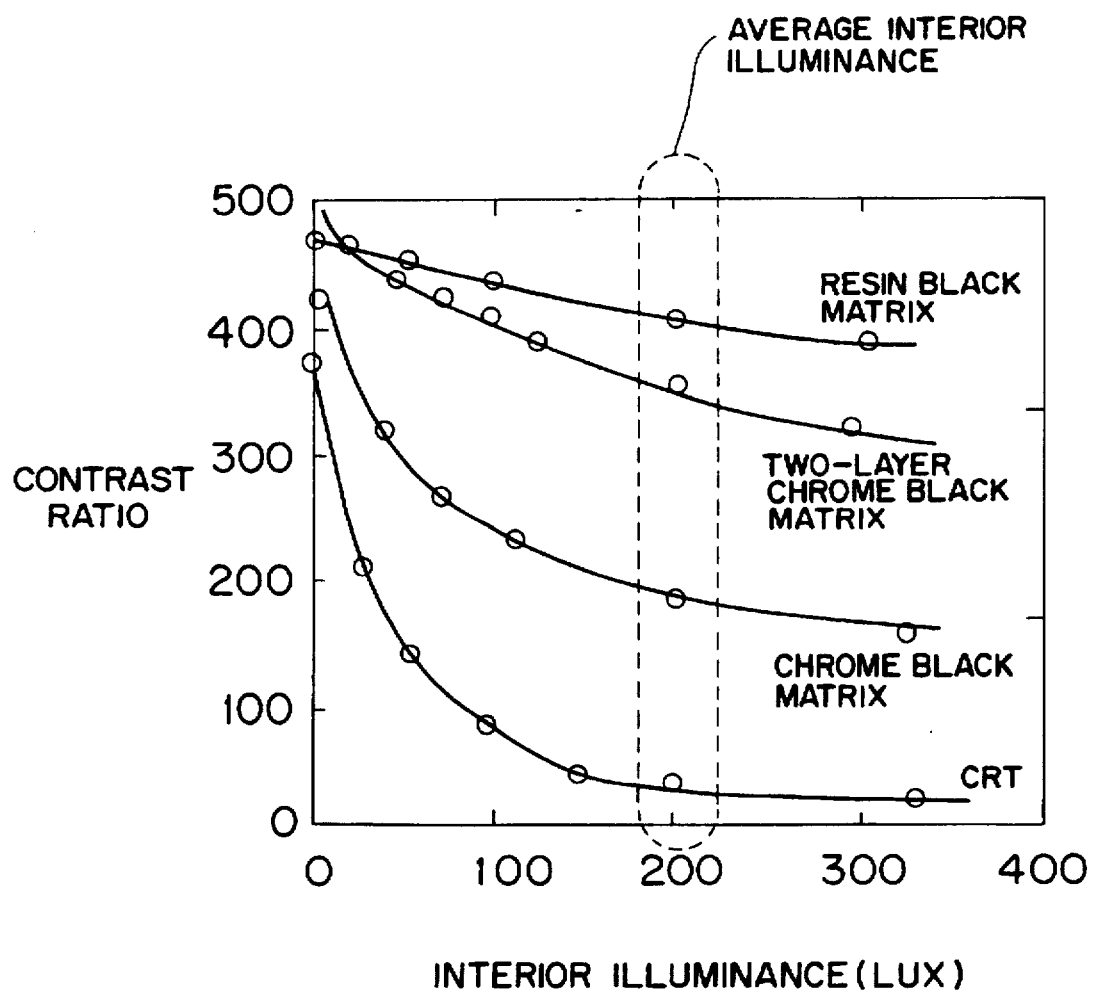
FIG. 1 shows the interior illuminance dependence of the contrast ration.

To obtain higher light-shadability, the carbon black must be finely dispersed, and in the present invention, for example, carbon black of 6.5 or less in pH is used. The pH of black matrix is preferably 4 or less, more preferably 3 or less. If the pH of carbon black is higher than 6.5, the light-shadability of carbon black is lowered, and dimensional stability is lowered, film peeling being liable to occur unpreferably. The pH of carbon black is measured by mixing 10 g of carbon black and 100 g of pure water sufficiently ultrasonically, boiling the mixture without allowing water to evaporate for 10 minutes, cooling to room temperature, and measuring the pH of the supernatant solution using a pH meter or hydrogen ion concentration meter, etc.

The pH of carbon black can be kept at 6.5 or less, by bringing carbon powder into contact with free oxygen at room temperature, for oxidation, or oxidizing with an oxidizing agent such as ozone or NO$_2$, or treating with bromine and water at atmospheric pressure or under pressure, or oxidizing in an oxidizing solution such as nitric acid or sulfuric acid, for providing acid groups such as carboxyl groups or hydroxyl groups on the surfaces of the carbon black particles. These methods can also be combined. Furthermore, acid groups such as sulfonic acid groups can also be formed by chemical reaction such as sulfonation with fuming sulfuric acid. The degree of the treatment can be adjusted by controlling the pH of carbon black.

In the present invention, it is also effective to use the carbon black of larger than 0.001 in concentration of at least one of the carboxyl group [COOH], the hydroxyl group [OH] and the sulfonic acid group [SO$_3$H] on the surface, as a molar ratio per all carbon atoms.

The carboxyl group concentration [COOH] on the surface is preferably 0.002 or more, more preferably 0.003 or more in view of dispersion stability. The upper limit is not especially limited, but usually [COOH]=0.1 is the upper limit in the production of carbon black.

The hydroxyl group concentration [OH] on the surface is preferably 0.002 or more, more preferably 0.003 or more in view of dispersion stability. Hydroxyl groups include neutral alcoholic hydroxyl groups and acid phenolic hydroxyl groups, and the amount of the phenolic hydroxyl groups is important. Therefore, it is preferable that the concentration of the phenolic hydroxyl groups is 50% or more of the concentration of hydroxyl groups. It is preferable that the concentration of the phenolic hydroxyl groups is 0.005 or more. The upper limit is not especially limited, but usually [OH]=0.1 is the upper limit in the production of carbon black.

The sulfonic acid group concentration [SO$_3$H] on the surface is preferably 0.002 or more, more preferably 0.003 or more in view of dispersion stability. The upper limit is not especially limited, but usually [SO$_3$H]=0.1 is the upper limit in the production of carbon black.

The hydroxyl group concentration, carboxyl group concentration and sulfonic acid group concentration on the surface can be quantified by X-ray photo-electric spectrometry called XPS or ESCA. Especially the use of X-ray photo-electric spectrometry in combination with chemical modification. For example, the concentration of hydroxyl groups can be quantified by letting hydroxyl groups react with trifluoroacetic anhydride for labeling, to distinguish carboxyl groups from hydroxyl groups, and detecting the FIS peak intensity by X-ray photo-electric spectrometry. The concentration of carboxyl groups can be quantified by letting carboxyl groups react with trifluoroethanol, etc. for labeling, and detecting the FIS peak intensity by X-ray photo-electric spectrometry.

The carbon black can be selected from channel black, roller black and disc black respectively produced by a contact method, gas furnace black and oil furnace black respectively produced by a furnace method, thermal black and acetylene black respectively produced by a thermal method, etc. Among them, the channel black, gas furnace black and oil furnace black are preferable, and especially furnace black is preferable.

To improve the light-shadability of black matrix, it is preferable to use carbon black smaller in particle diameter, and the average primary particle diameter is preferably 5 to 40 nm, more preferably 6 to 35 nm, still more preferably 8 to 30 nm.

As for the structure of carbon black in the black matrix, fine carbon black particles cohere to form secondary particles of carbon black, and it is preferable to finely disperse for keeping the average secondary particle diameter smaller. It is ideal that the carbon black is stably dispersed as primary particles without forming secondary particles. The average secondary particle diameter is preferably 5 to 100 nm, more preferably 6 to 88 nm, and still more preferably 8 to 75 nm. If the average particle diameter is larger than the range, sufficient light-shadability cannot be obtained. For measuring the average primary particle diameter and the average secondary particle diameter, for example, by a transmission type or scanning type electron microscope, etc., and the average particle diameter is determined according to JIS R 6002.

The carbon black small in particle diameter mainly has a color tone of brown. For this reason, it is preferable to mix pigments of additive complementary color to the carbon black, for making it achromatic. As the resin black matrix, it is preferable to disperse, in the resin, a light-shading agent consisting of carbon black and pigments of additive complementary color to the carbon black. The additive complementary color of brown is blue or violet. As a pigment of additive complementary color, a blue pigment or a violet pigment or a mixture thereof can be used. However, when a colored resin is used, pigments of additive complementary color to the color mixture of the resin and carbon black is used. Typical examples of pigments are enumerated below as color index (CI) numbers. As a blue pigment or violet pigment, an organic pigment high in tinting strength is especially preferable. Examples of blue pigments include Pigment Blue 15, 15:1, 15:2, 15:3, 15:4, 15:6, 16, 21, 22, 60, 64, etc. Especially Pigment Blue 15, 15:1, 15:2, and 15:6 are preferable. Examples of violet pigments include Pigment Violet 19, 23, 29, 31, 32, 33, 36, 37, 39, 43, 50, etc. Especially Pigment Violet 23, 31, 33, 43 and 50 are preferable.

In addition, various other light-shading agents can be added to such an extent that light-shadability is not lowered, but to obtain high light-shadability, the amount of the carbon black among all the light-shading agents is preferably 50 wt. % or more, more preferably 60 wt. % or more, still more preferably 70 wt. % or more. The light-shading agents other than carbon black include metal oxide powder such as titanium oxide powder and iron tetraoxide powder, metal sulfide powder, metal powder, and also mixture such as of red pigment, green pigment and blue pigment.

In the achromatic resin black matrix of the present invention, in the XYZ system of color representation, the relation between the chromaticity coordinates (x, y) of transmitted light and reflected light of the resin black matrix in C light source or F10 light source and the chromaticity coordinates (xo, yo) of the light source is $(x-xo)^2+(y-yo)^2 \leq 0.01$, more preferably $(x-xo)^2+(y-yo)^2 < 0.0025$, still more preferably $(x-xo)^2+(y-yo)^2 < 0.0004$.

Furthermore, a color liquid crystal display device is usually provided with a back light source for improving the visibility. In the resin black matrix of the present invention, in the XYZ system of color representation, the relation between the chromaticity coordinates (x, y) of the light leaking through the resin black matrix and the chromaticity coordinates (xo, yo) of the back light is $(x-xo)^2+(y-yo)^2 \leq 0.01$, more preferably $(x-xo)^2+(y-yo)^2 < 0.0025$, still more preferably $(x-xo)^2+(y-yo)^2 < 0.0004$.

The back light usually used is a light source of three wavelengths with the energy concentrated at the peaks of the transmission spectra of red, blue and green pixels of the color filter. A three-wavelength light source has peaks strong in light energy at specific three wavelengths in a visible light range (400 to 700 nm), and they are called the main wavelengths. The main wavelengths are defined as a range of ±10 nm of the highest peak in the energy of blue light in a wavelength range from 400 to 490 nm, a range of ±10 nm of the highest peak in the energy of green light in a wavelength range from 490 to 580 nm, and a range of ±10 nm of the highest peak in the energy of red light in a wavelength range from 580 to 675 nm. Usually the respective ranges are 440 to 460 nm, 530 to 550 nm, and 600 to 620 nm.

In the transmittances of the resin black matrix at the respective wavelengths, the maximum value of each wavelength does not exceed preferably 4 times, more preferably 2 times, still more preferably 1.5 times the minimum value. If the difference is larger, the light leaking through the three-wavelength light source is colored, to impair the image display image. The transmittance of the resin black matrix at each wavelength is the average value of the values at three points of the highest energy peak, ±10 nm and −10 nm.

The black matrix has a light-shadability of preferably 2.3 or more, more preferably 3.1 or more, still more preferably 3.5 or more in the optical density per 1 μm film thickness of the black matrix in a visible light range of 430 to 640 nm in wavelength. Hereinafter the optical density per 1 μm film thickness in a visible light range of 430 to 640 nm in wavelength is defined as the light-shadability. To improve the light-shadability, it is important to improve the dispersibility and dispersion stability of the light-shading agent. To obtain such a high light-shadability, the amount of carbon black contained in the black matrix is preferably 35 wt. % or more, more preferably 45 wt. % or more, still more preferably 60 wt. % or more.

The reference color stimulus Y in the XYZ system of the black matrix in a visible light range of 400 to 700 in wavelength is preferably 0.50 or less, more preferably 0.079 or less, still more preferably 0.025 or less.

The film thickness of the black matrix is preferably less than 1 μm, more preferably 0.75 μm or less, still more preferably 0.5 μm or less. It is preferable that the film thickness of the black matrix is small, since the level difference on the surface of the color filter becomes small. If the film thickness of the black matrix is kept at 0.5 μm or less, the protective layer can be omitted and it is especially preferable. There is no particular lower limit, but 0.3 μm or more is preferable in view of the strength of the black matrix, the dimensional stability of the pattern, etc.

The resin for the black matrix can be selected from polyimide resin, acrylic resin, PVA, gelatin, polyester resin, polyvinyl resin, etc. It is preferable that the resin has heat resistance higher than that of the resins used for the pixels and the protective film, and accordingly, a polyimide resin of 250° C. or higher in heat resistance is more preferable. The polyimide resin, which includes a polyamideimide, though not limited, obtained by imidating a polyimide precursor (n=1 to 2) mainly composed of a structural component represented by the general formula (1) by heating or using a proper catalyst, can be suitably used.

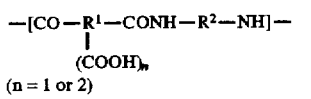

(n = 1 or 2)

In the above general formula (1), $R^1$ is a trivalent or tetravalent organic group with at least two or more carbon atoms. In view of heat resistance, it is preferable that $R^1$ is a trivalent or tetravalent group which contains a cyclic hydrocarbon, aromatic ring or aromatic heterocyclic ring, and has 6 to 30 carbon atoms.

$R^1$ can be selected from, though not limited to, a phenyl group, biphenyl group, terphenyl group, naphthalene group, perylene group, diphenyl ether group, diphenyl sulfone group, diphenyl propane group, benzophenone group, biphenyl trifluoropropane group, cyclobutyl group, cyclopentyl group, etc.

$R^2$ is a divalent organic group with at least two or more carbon atoms, but in view of heat resistance, it is preferable that $R^2$ is a divalent group which contains a cyclic hydrocarbon, aromatic ring or aromatic heterocyclic ring, and has 6 to 30 carbon atoms.

$R^2$ can be selected from, though not limited to, a phenyl group, biphenyl group, terphenyl group, naphthalene group, perylene group, diphenyl ether group, diphenyl sulfone group, diphenyl propane group, benzophenone group, biphenyl trifluoropropane group, diphenyl methane group, dicyclohexyl methane group, etc.

In the polymer mainly composed of the structural component (1), $R^1$ and $R^2$ may be one of those enumerated above respectively or a copolymer consisting of two or more of those enumerated above respectively. Furthermore, to improve the adhesiveness to the substrate, it is preferable to copolymerize with bis(3-aminopropyl) tetramethyldisiloxane with siloxane structure as a diamine component to such an extent not to lower heat resistance.

The polymer mainly composed of the structural component (1) can be selected from, though not limited to, polyimide precursors synthesized from one or more carboxylic dianhydrides selected from a group consisting of pyromellitic dianhydride, 3,3',4,4'-benzophenonetetracarboxylic dianhydride, 3,3',4,4'-biphenyltrifluoropropanetetracarboxylic dianhydride, 3,3',4,4'-biphenylsulfonetetracarboxylic dianhydride, 2,3,5-tricarboxycyclopentylacetic dianhydride, and from one or more diamines selected from a group consisting of paraphenylenediamine, 3,3'-diaminodiphenyl ether, 4,4'-diaminodiphenyl ether, 3,4'-diaminodiphenyl ether, 3,3'-diaminodiphenyl sulfone, 4,4'-diaminodiphenyl sulfone, 4,4'-diaminodicyclohexylmethane, and 4,4'-diaminodiphenylmethane, etc.

Such a polyimide precursor can be synthesized by any conventional method, that is, by letting a selected combination consisting of a tetracarboxylic dianhydride and a diamine react in a solvent.

Usually to seal the polyimide precursor at the ends of its molecule for stopping polymerization, a dicarboxylic anhydride such as maleic anhydride is added. However, if the molecular ends of the polyimide resin are amine groups, the dispersibility of the light-shading agent is enhanced more, preferably. The existing rate of amine groups at the molecular ends is preferably 50% or more, more preferably 80% or more, still more preferably 90% or more. To make amine groups exist at the molecular ends of the polyimide resin, it is preferable to keep the number of moles of the diamine slightly larger than that of the tetracarboxylic dianhydride when they are caused to react in a solvent for synthesizing the corresponding polyimide precursor. In more detail, preferably 100 to 90 moles, more preferably 98 to 93 moles, still more preferably 97 to 95 moles are used for 100 moles of the diamine.

The polyimide resin is more preferably higher in photoabsorbability in the wavelengths of a visible light range, since the black matrix becomes higher in light-shadability. The polyimide resin used as a 2 μm thick polyimide film is preferably 96 or less, more preferably 90 or less, still more preferably 80 or less in the reference color stimulus Y in the XYZ system of color representation in a visible light range of 400 to 700 nm in wavelength.

The tetracarboxylic dianhydride is preferably higher in the electron-withdrawal of the acid dianhydride residue, and can be preferably selected from those types with ketone residue like benzophenone, or ether type like phenyl ether group, or phenyl group or sulfone group like diphenylsulfone group, for example, pyromellitic dianhydride, 3,3',4, 4'-benzophenonetetracarboxylic dianhydride and 3,3',4,4'-biphenyltetracarboxylic dianhydride. The diamine is preferably higher in the electron-donacity of diamine residue, and can be preferably selected from those with biphenyl group, p-, p-substituted or m-, p-substituted diaminodiphenyl ether, methylenedianiline group, naphthalene group or perylene group, etc., for example, 4,4'- or 3,4'-diaminodiphenyl ether, paraphenylenediamine, etc. These diamines with a nitro group substituting at the aromatic ring are also preferable.

The resin black matrix can be formed by applying a black paste with a light-shading agent composed of specific carbon black dispersed in a resin or its precursor solution, for coating.

The specific carbon black of the present invention is the carbon black satisfying at least one of the following features of (A) to (D).

(A) 6.5 or less in pH (B) $0.001<[COOH]$ in the carboxyl group concentration [COOH] on the surface, as a molar ratio per all carbon atoms (C) $0.001<[OH]$ in the hydroxyl group concentration [OH] on the surface, as a molar ratio per all carbon atoms (D) $0.001<[SO_3H]$ in the sulfonic acid group concentration $[SO_3H]$ on the surface, as a molar ratio per all carbon atoms The pH of carbon black is determined with the previously mentioned pH meter or hydrogen ion concentration meter. The pH of carbon black is more preferably 4 or less, still more preferably 3 or less. If the pH of carbon black is higher than 6.5, the light-shadability of carbon black is lowered, and dimensional stability is lowered, film peeling being liable to occur unpreferably. It is also effective for the black paste of the present invention to use the carbon black of larger than 0.001 in at least one of the carboxyl group concentration [COOH], the hydroxyl group concentration [OH] and the sulfonic acid group concentration $[SO_3H]$ respectively on the surfaces of carbon black grains, as a molar ratio per all carbon atoms.

The carboxyl group concentration [COOH] on the surfaces of carbon black grains is more preferably 0.002 or more, still more preferably 0.003 or more in view of dispersion stability. The upper limit is not especially limited, but usually [COOH]=0.1 is the upper limit in the production of carbon black.

The hydroxyl group concentration [OH] on the surfaces of carbon black grains is more preferably 0.002 or still more, more preferably 0.003 or more in view of dispersion stability. Total hydroxyl groups include neutral alcoholic hydroxyl groups and acid phenolic hydroxyl groups, and the amount of the phenolic hydroxyl groups is important. Therefore, it is preferable that the concentration of the phenolic hydroxyl groups is 50% or more of the concentration of the total hydroxyl groups. It is preferable that the concentration of the phenolic hydroxyl groups is 0.005 or more. The upper limit is not especially limited, but usually [COOH]=0.1 is the upper limit in the production of carbon black.

The sulfonic acid group concentration $[SO_3H]$ on the surfaces of carbon black particles is preferably 0.002 or more, more preferably 0.003 or more in view of dispersion stability. The upper limit is not especially limited, but usually $[SO_3H]=0.1$ is the upper limit in the production of carbon black.

For determining concentrations of hydroxyl group [OH], carboxylic group [COOH] and sulfonic acid group $[SO_3H]$ on the surface of carbon black, X-ray photo-electric spectrometry called XPS or ESCA can be used as described above.

The average primary particle diameter of the carbon black is preferably 5 to 40 nm, more preferably 6 to 35 nm, still more preferably 8 to 30 nm. As for the structure of carbon black in the resin black matrix, fine carbon black particles cohere to form secondary particles of carbon black. It is preferable to finely disperse carbon black for keeping the average secondary particle diameter smaller. It is ideal that the carbon black is stably dispersed as primary particles without forming secondary particles. The average secondary particle diameter is preferably 5 to 100 nm, more preferably 6 to 88 nm, and still more preferably 8 to 75 nm. For measuring the average primary particle diameter and the average secondary particle diameter, for example, carbon black is observed by a transmission type or scanning type electron microscope, etc., after applying and drying the black paste, and the average particle diameter is obtained according to JIS R 6002.

It is preferable to mix pigments of additive complementary color to the carbon black, for making it achromatic. As the black paste of the present invention, it is preferable to disperse, in the resin or its precursor solution, a light-shading agent consisting of carbon black and pigments of additive complementary color to the carbon black. For example, a blue pigment or a violet pigment or a mixture thereof can be used. An organic pigment high in tinting strength is especially preferable.

In addition, various other light-shading agents can be added to such an extent that light-shadability is not lowered, but to obtain high light-shadability, the rate of the carbon black among all the light-shading agents is preferably 50 wt. % or more, more preferably 60 wt. % or more, still more preferably 70 wt. % or more. The light-shading agents other than carbon black include metal oxide powder such as titanium oxide powder and iron tetraoxide powder, metal sulfide powder, metal powder, and also mixture of red pigment, green pigment, blue pigment, etc.

Furthermore, in the resin black paste of the present invention, in the XYZ system of color coordinates, the relation between the chromaticity coordinates (x, y) of transmitted light of the resin black paste in C light source or F10 light source and the chromaticity coordinates (xo, yo) of the light source is $(x-xo)^2+(y-yo)^2$ 0.01, more preferably $(x-xo)^2+(y-yo)^2<0.0025$, still more preferably $(x-xo)^2+(y-yo)^2<0.0004$, when the reference color stimulus Y is $0.03 \leq Y \leq 0.3$.

For measuring the color of the transmitted light of the black paste, at first, the light transmittance is measured. The transmittance can be obtained by measuring a predetermined amount of the black paste applied on glass, using a spectrophotometer, or by measuring the black paste in a glass cell, using a spectrophotometer, or any other way. From the light transmittance spectrum, the reference color stimuli X, Y and Z in C light source or F10 light source are calculated, to calculate the chromaticity coordinates.

The resin or its precursor solution can be a solution of a polyimide precursor, acrylic resin, PVA, gelatin, polyester resin or polyvinyl resin, etc., but the resin is preferably higher in heat resistance than the resins used for the pixels and the protective film. A solution of a polyimide precursor which can form polyimide of 250° C. or higher in heat resistance is preferable. The polyimide precursor can be preferably selected from the polyimide precursors enumerated before.

Therefore, the polyimide precursor is more preferably higher in photo-absorbability in the wavelengths of a visible light range, since the black matrix becomes higher in light-shadability. The polyimide precursor used as a 2 μm thick polyimide film is preferably 96 or less, more preferably 90 or less, still more preferably 80 or less in the reference color stimulus Y in the XYZ system of color coordinates. These values can be calculated by measuring the light transmittance spectrum of the polyimide film in a visible light range of 400 to 700 nm in wavelength. The tetracarboxylic dianhydride is preferably higher in the electron-withdrawal of the acid dianhydride residue, and can be preferably selected from those types with ketone residue like benzophenone, or ether type like phenyl ether group, or phenyl group or sulfone group like diphenylsulfone group, for example, pyromellitic dianhydride, 3,3',4,4'-benzophenonetetracarboxylic dianhydride and 3,3',4,4'-biphenyltetracarboxylic dianhydride. The diamine is preferably higher in the electron-donacity of diamine residue, and can be preferably selected from those with biphenyl group, p-, p-substituted or m-, p-substituted diaminodiphenyl ether, methylenedianiline group, naphthalene group or perylene group, etc., for example, 4,4'- or 3,4'-diaminodiphenyl ether, paraphenylenediamine, etc. These diamines with a nitro group substituting at the aromatic ring are also preferable.

The solvent of the black paste can be usually selected from N-methyl-2-pyrrolidone, amide based polar solvents such as N,N-dimethylacetamide and N,N-dimethylformamide, lactone based polar solvents, dimethyl sulfoxide, etc. To enhance the effect of dispersing carbon black, it is preferable to use at least an amide based polar solvent. It is more preferable to use a mixed solvent containing an amide based polar solvent as a main component, or an amide based polar solvent alone. The mixed solvent containing an amide based polar solvent as a main component means that the amide based polar solvent is contained by $(1/n) \times 100$ wt. % or more, where n is the number of solvents mixed. For example, in a two-component solvent, the amide based polar solvent content is 50 wt. % or more, and in a three-component solvent, the amide based polar solvent content is 33 wt. % or more.

If any other light-shading agent than carbon black is also added, it is preferable to contain at least a lactone based polar solvent additionally for enhancing the effect of dispersing the light-shading agent. This gives effective action especially when a rosin resin acid is used as a dispersing agent. A lactone refers to an aliphatic cyclic ester with 3 to 12 carbon atoms, and can be selected, for example, from β-propiolactone, γ-butyrolactone, γ-valerolactone, δ-valerolactone, γ-caprolactone, ε-caprolactone, etc. In view of the dissolution of the polyimide precursor, γ-butyrolactone is especially preferable. For these reasons, it is preferable to use a mixed solvent consisting of an amide based polar solvent and a lactone based polar solvent.

As a further other solvent, to enhance coatability, it is preferable to add a solvent higher in evaporation rate such as methyl cellosolve, ethyl cellosolve, methyl carbitol, ethyl lactate, etc., or an ether acetate solvent of ethylene glycol or propylene glycol of 26 to 33 dynes in surface tension, preferably by 1 to 25 wt. %, more preferably 5 to 20 wt. % based on the weight of the entire mixed solvent. It can be selected, for example, from propylene glycol methyl ether acetate, 3-methyl-3-methoxybutyl acetate, ethylene glycol ethyl ether acetate, 3-methoxybutyl acetate, etc. It is preferable to disperse the light-shading agent such as carbon black in a solution containing any of these solvents, because of less heat generation during dispersion, less proneness to gelation, and higher dispersibility.

The light-shading agent such as carbon black can be dispersed, for example, by mixing the light-shading agent and a dispersing agent into a resin or its precursor solution, and dispersing in a dispersing machine such as a three-roll mill, sand grinder or ball mill, etc. However, when any other light-shading agents than carbon black are used, it is more preferable to disperse the respective light-shading agents separately and then to mix them. When a polyimide precursor is used as the resin, it is more preferable to add the light-shading agent into a solvent for pre-dispersion, and then to add or disperse the polyimide precursor later, for preventing the reaction of the polyimide precursors during dispersion, the rise of viscosity caused by the reaction between the light-shading agent and the polyimide precursor, gelation, etc. Furthermore, it is more preferable to disperse or mix using a solvent suitable for dispersion of carbon black and other light-shading agents than carbon black, or to disperse or mix using a polyimide precursor containing the solvent. Moreover, it is preferable to properly adjust the dispersion intensity, dispersion time, etc. for finely dispersing the light-shading agent.

As for the rheology of the black paste, the yield value obtained by Casson's flow equation is preferably 0.1 Pa or less, more preferably 0.01 P or less, still more preferably 0.001 Pa or less. If the dispersion stability of the light-shading agent is poor, the yield value becomes larger than it, to cause the coagulation of the light-shading agent, for lowering the light-shadability of the black matrix unpreferably. Since the black paste of the present invention uses specified carbon black, a low yield value can be obtained. If S is shearing stress, D is shearing rate, τ0 is yield value and μ0 is Casson viscosity, then the flow equation is expressed by the following formula (1), and the yield value can be the square of the intercept on the $S^{1/2}$ axis in the graph of $S^{1/2}$ for $D^{1/2}$.

$$\sqrt{S} = \sqrt{\tau 0} + \sqrt{\mu 0} \cdot \sqrt{D} \qquad (1)$$

The viscosity is properly adjusted to suit the coating method, but is preferably 5 to 1000 cP, more preferably 8 to 150 cP, still more preferably 10 to 100 cP.

To the black paste, any of various additives can be added for the purpose of enhancing the dispersibility of the light-shading agent. In addition, various other additives, such as surfactant, can be added for improving coatability and leveling property.

A color filter for liquid crystal display devices, in which a resin black matrix, pixels and a protective film are constructed on a light transmittable substrate in this order is described below as an example. At first, a light transmittable substrate is coated with a black paste. The light transmittable substrate can be preferably selected from films, sheets, etc. of inorganic glass such as quartz glass, borosilicate glass or soda lime glass, and organic plastic materials. The coating method can be preferably selected from dip coating, roll coating, and rotary coating using a whirler, spinner, etc. Then, the coated substrate is dried to be semi-cured by a hot air oven or hot plate, etc. The semi-curing conditions depend on the polyimide precursor used, and the coating amount to some extent, but usually heating at 100° to 180° C. for 1 to 60 minutes is general. If a non-photosensitive polyimide precursor is used, it is then coated with a photoresist, pre-baked, and exposed using an photo mask. Subsequently the development of the resist and the patterning of the black matrix are effected continuously using a developer by dipping, showering or puddling, etc. Then, using a remover, the resist is removed by dipping, showering or puddling, etc. Finally it is heated to be cured at 200° to 400° C. for 1 to 60 minutes for imidation. The black matrix contains openings of usually about 20 to 200 µm width, and in a subsequent step, pixels are formed in the openings.

Then, pixels of plural colors are formed in the openings of the black matrix. Usually, the colors of the pixels are three colors of red, blue and green, and they are colored by coloring agents. The coloring agents suitably used for the pixels can be organic pigments, inorganic pigments, dyes, etc. Suitable organic pigments are based on phthalocyanines, azo lakes, condensed azos, quinacridones, anthraquinones, perylenes, perynones, etc. The resin used for pixels can be selected from photosensitive and non-photosensitive materials such as epoxy based resins, acrylic resins, polyimide based resins, urethane based resins, polyester based resins, polyvinyl based resins, and dyeable animal protein resins such as gelatin, and it is preferable to disperse or dissolve coloring agents in any of these resins for coloration.

At first, the resin paste containing coloring agents is applied by dip coating, roll coating, or rotary coating using a whirler or spinner, etc. Then, it is dried by hot air or hot plate, etc. to form a color layer of the first color on the black matrix. Since a color filter usually has pixels of plural colors, the unnecessary portions are removed by the photolithography, to form a desired pixel pattern of the first color. The thickness of the pixel film is about 0.5 to 3 µm. This operation is repeated as necessary times as the number of pixel colors, to form pixels composed of plural colors, for preparing a color filter.

Subsequently as required, a protective film is overcoated. The resin of the protective film is not especially limited, and can be selected, for example, from acrylic resin, epoxy resin, silicone resin, polyamide resin, etc.

As another method, so-called back exposure method can be used. In this method, patterned pixels are formed on a light transmittable substrate, then coated with a photosensitive black paste, and exposed from the light transmittable substrate side, to form a black matrix in the spaces free from the pixels using the pixels as a mask.

Finally as required, an ITO transparent electrode can be formed and patterned according to conventional methods.

A resin black matrix for liquid crystal display device of the present invention may be provided on the substrate, instead of being provided on the color filter of the liquid crystal display device. For example, it may be provided on the TFT matrix array substrate in the case of a TFT-LCD, on the MIM matrix array substrate in the case of a MIM-LCD, or on the opposite stripe-like electrode substrate in the case of a STN-LCD.

An example of a method to produce a liquid crystal display device that has a color filter provided with a resin black matrix prepared as described above is as follows: liquid crystal alignment layer is formed on a color filter and subjected to rubbing treatment, and another sheet of alignment layer is formed in the same way on the counter electrodes, subjected to rubbing treatment, and combined with, followed by injection of liquid crystal between the electrodes and assembling of liquid crystal cells to provide a color liquid crystal display device that has a color filter as described above in the liquid crystal cells.

As compared with other black matrixes, the black matrix in a liquid crystal display device produced as described above is low in reflectance and its color is neutral black, leading to the following good properties:

(1) High contrast of the display is achieved even in a bright place (high visibility).
(2) The colors of red, green, and blue are vivid.
(3) A natural black color is achieved.
(4) The reflection of surrounding fixtures etc. is small.
(5) The reflection is not tinted.

The present invention is described below concretely in reference to examples, but is not limited thereto or thereby.
[Preparation of polyimide precursor solution]

One hundred and forty seven grams of 3,3',4,4'-biphenyltetracarboxylic dianhydride was supplied together with 775 g of N-methyl-2-pyrrolidone, and 95.10 g of 4,4'-diaminodiphenyl ether and 6.20 g of bis(3-aminopropyl)tetramethyldisiloxane were added. Reaction was effected at 60° C. for 3 hours, to obtain a polyimide precursor solution of 600 poises (25° C.) in viscosity. It was about 27 in average polymerization degree and had amine groups at both the ends. It was applied onto a non-alkali glass (OA-2 produced by Nippon Electric Glass Co., Ltd.) substrate, to form a film of 2 µm in finished (after curing) thickness using a spinner, and it was dried in hot air at 80° C. for 10 minutes, semi-cured at 120° C. for 20 minutes and cured at 300° C. for 30 minutes. The reference color stimulus Y of the polyimide film was 95.

EXAMPLE 1

The following carbon black mill base and blue pigment mill base were dispersed at 7000 rpm using a homogenizer for 30 minutes, and they were mixed. The glass beads were removed by filtration to prepare a black paste. The black paste was 30 cP in viscosity and $2.0 \times 10^{-4}$ Pa in yield value. The light-shading agent used was brown carbon black and a blue pigment as an additive complementary color to it.

| (1) Carbon black mill base | |
|---|---|
| Carbon black (furnace black of 2.8 in pH, 28 nm in average primary particle diameter, 55 nm in average secondary particle diameter) | 4.6 parts |
| Polyimide precursor solution | 23.0 parts |
| N-methylpyrrolidone | 61.4 parts |
| Glass beads | 90.0 parts |
| (2) Blue pigment mill base | |
| Pigment Blue 15 | 2.2 parts |
| Polyimide precursor solution | 23.0 parts |
| Abietic acid | 0.2 part |
| γ-butyrolactone | 63.6 parts |
| Glass beads | 90.0 parts |

The black paste was applied onto a non-alkali glass (OA-2 produced by Nippon Electric Glass Co., Ltd.) by a spinner, dried in hot air at 80° C. for 10 minutes and semi-cured at 120° C. for 20 minutes. Then, a positive type resist (Shipley "Microposit" RC100 30 cp) was applied using a spinner, and dried at 80° C. for 20 minutes. Exposure machine PLA-501F produced by Canon Inc. was used for exposure through a photo mask, and an alkali developer (Shipley "Microposit" 351) was used for simultaneously developing the positive type resist and etching the polyimide precursor. Subsequently, the positive type resist was removed by methyl cellosolve acetate. It was cured at 300° C. for 30 minutes, to form a lattice black matrix with openings of 240 µm lengthwise and 60 µm crosswise with a thickness of 0.98 µm.

Then, as red, green and blue pigments, a dianthraquinone based pigment indicated as Color Index No. 65300 Pigment Red 177, a phthalocyanine green based pigment indicated as Color Index No. 74265 Pigment Green 36, and a phthalocyanine blue based pigment indicated as Color Index No. 74160 Pigment Blue 15-4 were arranged. The pigments were mixed with the polyimide precursor solution respectively, to obtain three color pastes of red, green and blue. At first, the light transmittable glass substrate was coated with the green paste on the side with the black matrix formed, and it was dried in hot air at 80° C. for 10 minutes and semi-cured at 120° C. for 20 minutes. Then, a positive type resist (Shipley "Microposit" RC100 30 cp) was applied by a spinner, and dried at 80° C. for 20 minutes. Exposure was executed using a mask, and an alkali developer (Shipley "Microposit" 351) was used for simultaneously developing the positive type resist and etching the polyimide precursor. Then, the positive type resist was removed by methyl cellosolve acetate, to form about 90 µm wide green pixels in stripes lengthwise at crosswise pitches of 300 µm. Furthermore, it was cured at 300° C. for 30 minutes to form a 1.5 µm thick pixel layer. After washing with water, similarly red and blue pixels were formed in stripes with pixel intervals between the respective three colors kept at 10 µm.

Then, a protective film was formed. At first, acetic acid was added to methyltrimethoxysilane, for hydrolysis, to obtain an organosilane condensation product. 3,3',4,4'-benzophenonetetracarboxylic dianhydride and 3-aminopropyltriethoxysilane were mixed at a molar ratio of 1:2 in n-methyl-2-pyrrolidone solvent for reaction to obtain a condensation product with imide groups. Said organosilane mixture, said condensation product with imide groups, and n-methyl-2-pyrrolidone were mixed at a ratio by weight 5:2:4, and the mixture was applied onto the substrate with red, blue and green organic color layers formed, and cured, to form a 3.0 µm thick protective layer made of a polyimide modified silicone polymer.

The light-shadability of the black matrix little depends on wavelengths, and in a wavelength range from 430 to 640 nm, it was 2.5 to 2.8 (optical density/µm). In this case, the reference color stimulus Y in a wavelength range from 400 to 700 nm was 0.40.

EXAMPLE 2

A carbon black mill base, a violet pigment and a blue pigment mill base respectively composed of the following were dispersed separately at 7000 rpm using a homogenizer for 30 minutes, and both of them were mixed. The glass beads were removed by filtration to prepare a black paste. The black paste was 33 cP in viscosity and $1.0 \times 10^{-4}$ Pa in yield value. The light-shading agent used was brown carbon black and a violet pigment and a blue pigment as pigments of additive complementary color to it.

| (1) Carbon black mill base | |
|---|---|
| Carbon black (furnace black of 3.5 in pH, 32 nm in average primary particle diameter, 60 nm in average secondary particle diameter) | 2.3 parts |
| Polyimide precursor solution | 8.0 parts |
| N-methylpyrrolidone | 61.2 parts |
| Glass beads | 71.5 parts |
| (2) Violet pigment mill base | |
| Pigment Violet 23 | 0.3 part |
| Polyimide precursor solution | 1.2 part |
| γ-butyrolactone | 2.2 parts |
| Glass beads | 3.7 parts |
| (3) Blue pigment mill base | |
| Pigment Blue 15 | 1.1 parts |
| Abietic acid | 0.1 part |
| Polyimide precursor solution | 4.9 parts |
| γ-butyrolactone | 8.8 parts |
| Glass beads | 14.9 parts |

A color filter was obtained as done in Example 1, except that the thickness of the black matrix film was 0.75 µm. The light-shadability of the black matrix little depended on wavelengths, and in a wavelength range from 430 to 640 nm, it was 3.1 to 3.4 (optical density/µm). In this case, the reference color stimulus Y in a wavelength range from 400 to 700 nm was 0.32.

EXAMPLE 3

A carbon black mill base, a violet pigment and a blue pigment mill base respectively composed of the following were dispersed separately at 7000 rpm using a homogenizer for 30 minutes, and both of them were mixed. The glass beads were removed by filtration to prepare a black paste. The black paste was 25 cP in viscosity and $4.7 \times 10^{-4}$ Pa in yield value. The light-shading agent used was brown carbon black and a blue pigment as pigments of additive complementary color to it.

| (1) Carbon black mill base | |
|---|---|
| Carbon black (furnace black of 6.0 in pH, 26 nm in average primary particle diameter, 55 nm in average secondary particle diameter) | 2.3 parts |
| Polyimide precursor solution | 6.6 parts |
| N-methylpyrrolidone | 61.2 parts |
| Glass beads | 71.5 parts |
| (2) Violet pigment mill base | |
| Pigment Violet 23 | 0.3 part |
| Polyimide precursor solution | 1.0 part |
| γ-butyrolactone | 2.2 parts |
| Glass beads | 3.7 parts |
| (3) Blue pigment mill base | |
| Pigment Blue 15 | 1.1 parts |
| Abietic acid | 0.1 part |
| Polyimide precursor solution | 4.0 parts |
| γ-butyrolactone | 8.8 parts |
| Glass beads | 14.9 parts |

A color filter was obtained as done in Example 1, except that the thickness of the black matrix film was 0.66 µm. The light-shadability of the black matrix little depended on wavelengths, and in a wavelength range from 430 to 640 nm, it was 3.5 to 3.8 (optical density/µm). In this case, the reference color stimulus Y in a wavelength range from 400 to 700 nm was 0.33.

EXAMPLE 4

A color filter was obtained as done in Example 3, except that the thickness of the black matrix film was 0.95 µm. The light-shadability of the black matrix little depended on wavelengths, and in a wavelength range from 430 to 640 nm, it was 3.5 to 3.8 (optical density/µm). In this case, the reference color stimulus Y in a wavelength range from 400 to 700 nm was 0.25.

EXAMPLE 5

A carbon black mill base and a blue pigment mill base respectively composed of the following were dispersed at 7000 rpm using a homogenizer for 30 minutes, and both of them were mixed. The glass beads were removed by filtration to prepare a black paste. The black paste was 32 cP in viscosity and $1.0 \times 10^{-4}$ Pa in yield value. The light-shading agent used was brown carbon black and a blue pigment as a pigment of additive complementary color to it.

| (1) Carbon black mill base | |
| --- | --- |
| Carbon black (furnace black of [COOH] = 0.004, 26 nm in average primary particle diameter, 57 nm in average secondary particle diameter) | 4.6 parts |
| Polyimide precursor solution | 23.0 parts |
| N-methylpyrrolidone | 61.4 parts |
| Glass beads | 90.0 parts |
| (2) Blue pigment mill base | |
| Pigment Blue 15 | 2.2 parts |
| Polyimide precursor solution | 23.0 parts |
| Abietic acid | 0.2 part |
| γ-butyrolactone | 63.6 parts |
| Glass beads | 90.0 parts |

A color filter was obtained as done in Example 1. The light-shadability of the black matrix little depends on wavelengths, and in a wavelength range from 430 to 640 nm, it was 2.5 to 2.8 (optical density/μm). In this case, the reference color stimulus Y in a wavelength range from 400 to 700 nm was 0.40.

EXAMPLE 6

A carbon black mill base, a violet pigment and a blue pigment mill base respectively composed of the following were dispersed separately at 7000 rpm using a homogenizer for 30 minutes, and they were mixed. The glass beads were removed by filtration to prepare a black paste. The black paste was 25 cP in viscosity and 5.0×10−5 Pa in yield value. The light-shading agent used was brown carbon black and a violet pigment and a blue pigment as pigments of additive complementary color to it.

| (1) Carbon black mill base | |
| --- | --- |
| Carbon black (furnace black of [OH] = 0.005, 30 nm in average primary particle diameter, 60 nm in average secondary particle diameter) | 2.3 parts |
| Polyimide precursor solution | 8.0 parts |
| N-methylpyrrolidone | 61.2 parts |
| Glass beads | 71.5 parts |
| (2) Violet pigment mill base | |
| Pigment Violet 23 | 0.3 part |
| Polyimide precursor solution | 1.2 part |
| γ-butyrolactone | 2.2 parts |
| Glass beads | 3.7 parts |
| (3) Blue pigment mill base | |
| Pigment Blue 15 | 1.1 parts |
| Abietic acid | 0.1 part |
| Polyimide precursor solution | 4.9 parts |
| γ-butyrolactone | 8.8 parts |
| Glass beads | 14.9 parts |

A color filter was obtained in the same way as disclosed in Example 1, except that the thickness of the black matrix film was 0.75 μm. The light-shadability of the black matrix little depended on wavelengths, and in a wavelength range from 430 to 640 nm, it was 3.1 to 3.4 (optical density/μm). In this case, the reference color stimulus Y in a wavelength range from 400 to 700 nm was 0.32.

EXAMPLE 7

A black paste was prepared as done in Example 2, except that a carbon black mill base composed as listed below was used. The black paste was 27 cP in viscosity and 7.0×10−4 Pa in yield value.

| (1) Carbon black mill base | |
| --- | --- |
| Carbon black (furnace black of [SO₃H] = 0.005, 25 nm in average primary particle diameter, 55 nm in average secondary particle diameter) | 2.3 parts |
| Polyimide precursor solution | 8.0 parts |
| N-methylpyrrolidone | 61.2 parts |
| Glass beads | 71.5 parts |

A color filter was obtained as done in Example 1. The light-shadability of the black matrix little depended on wavelengths, and in a wavelength range from 430 to 640 nm, it was 3.1 to 3.4 (optical density/μm). In this case, the reference color stimulus Y in a wavelength range from 400 to 700 nm was 0.32.

Comparative Example 1

A color filter was obtained as done in Example 1, except that the following carbon black was used.

| | |
| --- | --- |
| Carbon black (furnace black of 8.0 in pH, 30 nm in average primary particle diameter, 80 nm in average secondary particle diameter) | 4.6 parts |

The black paste was 55 cP in viscosity and 0.25 Pa in yield value. The light-shadability of the black matrix was 1.9 to 2.3 (optical density/μm) in a wavelength range from 430 to 640 nm, being higher in the dependence on wavelength compared to Example 1, and the light-shadability was too low to be acceptable. The reference color stimulus Y in a wavelength range from 400 to 700 nm was 0.70.

Comparative Example 2

A carbon black mill base composed as listed below was dispersed at 7000 rpm using a homogenizer for 30 minutes, and glass beads were removed by filtration to prepare a black paste. The black paste was 55 cP in viscosity and 0.2 Pa in yield value. As the light-shading agent, brown carbon black only was used.

| (1) Carbon black mill base | |
| --- | --- |
| Carbon black (furnace black of 8.0 in pH, 30 nm in average primary particle diameter, 80 nm in average secondary particle diameter) | 4.6 parts |
| Polyimide precursor solution | 57.0 parts |
| N-methylpyrrolidone | 120.0 parts |
| Glass beads | 180.0 parts |

A color filter was obtained as done in Example 1, except that the thickness of the black matrix film was 1.4 μm. The light-shadability of the black matrix heavily depended on wavelengths, and was lower on the longer wavelength side. The light-shadability was 1.5 to 2.2 (optical density/μm) in a wavelength range from 430 to 640, being unacceptable. The reference color stimulus Y in a wavelength range from 400 to 700 nm was 0.3.

Comparative Example 3

A color filter was obtained as done in Example 1, except that the following carbon black was used.

| Carbon black (furnace black of [COOH] < 0.001, [OH] < 0.001, [SO$_3$H] < 0.001, 55 nm in average primary particle diameter, 110 nm in average secondary particle diameter) | 4.6 parts |
|---|---|

The black paste was 60 cP in viscosity and 0.30 Pa in yield value. The light-shadability of the black matrix was 1.9 to 2.3 (optical density/μm) in a wavelength range from 430 to 640 nm and the light-shadability was too low, compared to Example 1, to be acceptable. The reference color stimulus Y in a wavelength range from 400 to 700 nm was 0.80.

Comparative Example 4

A carbon black mill base composed as listed below was dispersed at 7000 rpm using a homogenizer for 30 minutes, and glass beads were removed by filtration to prepare a black paste. The black paste was 55 cP in viscosity and 0.2 Pa in yield value. As the light-shading agent, brown carbon black only was used.

| (1) Carbon black mill base | |
|---|---|
| Carbon black (furnace black of [COOH] < 0.001, < [OH] < 0.001, [SO$_3$H] < 0.001, 55 nm in average primary particle diameter, 110 nm in average secondary particle diameter) | 4.6 parts |
| Polyimide precursor solution | 57.0 parts |
| N-methylpyrrolidone | 120.0 parts |
| Glass beads | 180.0 parts |

A color filter was obtained as done in Example 1, except that the thickness of the black matrix film was 1.4 μm. The light-shadability of the black matrix heavily depended on wavelengths, and was lower on the longer wavelength side. The light-shadability was 1.5 to 2.2 (optical density/μm) in a wavelength range from 430 to 640, being unacceptable. The reference color stimulus Y in a wavelength range from 400 to 700 nm was 0.3.

In Table 1-1, pH value, average primary particle diameter, average secondary particle diameter of the carbon black and pigment of additive complimentary color of the carbon black used, together with viscosity, yield value, shadability of black matrix and dependency of shadability on wave-length of black paste in each of the examples and comparative examples are shown.

In Table 1-2, carboxyly group concentration [COOH], hydroxyl group concentration [OH], sulfonic acid group concentration [SO$_3$H], average primary particle diameter, average secondary particle diameter and pigment of additive complimentary color of the carbon black used together with viscosity, yield value, shadability of black matrix and dependency of shadability on wave length of black paste in each of the examples and comparative examples are shown.

Table 2 lists the chromaticity coordinates of transmitted light of the respective resin black matrixes in C light source.

Table 3 lists the chromaticity coordinates of transmitted light of the respective resin black matrixes during back light irradiation.

Table 4 lists the light transmittances of the respective resin black matrixes at the respective main wavelengths of back light.

Table 5 lists the chromaticity coordinates of transmitted light of the respective black pastes in C light source.

FIG. 1 shows the interior illuminance dependence of the contrast ratio (visibility; normally defined as white brightness/black brightness, but when reflected light exists, it is defined as (white brightness+reflection)/(black brightness+reflection)) of a liquid crystal display device (thin film transistor, or TFT, type) that has a color filter provided with a resin black matrix prepared as described above, and other devices of chrome black matrix type and two-layer chrome (CrO$_x$/Cr) black matrix type, as well as a color CRT for comparison. The brightness was measured using Topcon Black Matrix 5 or Black Matrix 7. Results have shown that the liquid crystal display device that has a color filter provided with a resin black matrix does not suffer a large decrease in contrast ratio even when the interior illuminance is high, indicating that its visibility is high even in a bright place.

Major perceived features of a liquid crystal display device that has a resin black matrix color filter are as follows:

(1) The colors of red, green, and blue are vivid.

(2) A natural black color is achieved.

(3) The reflection of surrounding fixtures etc. is small.

(4) The reflection is not tinted.

A survey was made on 100 test users. Results statistically proved the features of the liquid crystal display device that has a resin black matrix color filter.

The present invention provides a method wherein a specific light shading agent is dispersed in resin as described above to produce a color filter for liquid crystal display device that has good color characteristics, said color filter serving to produce display devices with high displaying quality.

TABLE 1-1

| | | | | | black paste | | black matrix | |
|---|---|---|---|---|---|---|---|---|
| | A | B | C | D | E | F | G | H |
| Example 1 | 2.8 | 28 | 55 | blue | 30 | 2.0 × 10$^{-4}$ | 2.5–2.8 | almost none |
| Example 2 | 3.5 | 32 | 60 | blue + violet | 33 | 1.0 × 10$^{-4}$ | 3.1–3.4 | almost none |
| Example 3 | 6.0 | 26 | 55 | blue + violet | 25 | 4.7 × 10$^{-4}$ | 3.5–3.8 | almost none |
| Example 4 | 6.0 | 26 | 55 | blue + violet | 25 | 4.7 × 10$^{-4}$ | 3.5–3.8 | almost none |
| Comparative Example 1 | 8.0 | 30 | 80 | blue | | 55 | 2.5 × 10$^{-1}$ | 1.9–2.3 | depend |
| Comparative Example 2 | 8.0 | 30 | 80 | none | | 55 | 2.0 × 10$^{-1}$ | 1.5–2.2 | depend |

TABLE 1-2

| | I | J | K | B | C | D | black paste | | black matrix | |
|---|---|---|---|---|---|---|---|---|---|---|
| | | | | | | | E | F | G | H |
| Example 5 | 0.004 | <0.001 | <0.001 | 26 | 57 | blue | 32 | $1.0 \times 10^{-4}$ | 2.5–2.8 | almost none |
| Example 6 | <0.001 | 0.005 | <0.001 | 30 | 60 | blue + violet | 25 | $5.0 \times 10^{-5}$ | 3.1–3.4 | almost none |
| Example 7 | <0.001 | <0.001 | 0.005 | 25 | 55 | blue + violet | 27 | $7.0 \times 10^{-4}$ | 3.1–3.4 | almost none |
| Comparative Example 3 | <0.001 | <0.001 | <0.001 | 55 | 110 | blue | 60 | $3.0 \times 10^{-1}$ | 1.9–2.3 | almost none |
| Comparative Example 4 | <0.001 | <0.001 | <0.001 | 55 | 110 | none | 55 | $2.0 \times 10^{-1}$ | 1.5–2.2 | depend |

A: pH value
B: average primary particle diameter (nm)
C: average secondary particle diameter (nm)
D: complementary additive color
E: viscosity (cP)
F: yielding value (Pa)
G: shadability (OD/μm)
H: dependence on wavelength
I: [COOH]
J: [OH]
K: [SO$_3$H]

TABLE 2

| | C light source | | Black matrix | | |
|---|---|---|---|---|---|
| | $x_o$ | $y_o$ | x | y | $(x_o - x)^2 + (y_o - y)^2$ |
| Example 1 | 0.31 | 0.32 | 0.32 | 0.37 | 0.003 |
| Example 2 | 0.31 | 0.32 | 0.30 | 0.31 | 0.000 |
| Example 3 | 0.31 | 0.32 | 0.30 | 0.31 | 0.000 |
| Example 4 | 0.31 | 0.32 | 0.29 | 0.30 | 0.001 |
| Example 5 | 0.31 | 0.32 | 0.32 | 0.37 | 0.003 |
| Example 6 | 0.31 | 0.32 | 0.30 | 0.31 | 0.000 |
| Example 7 | 0.31 | 0.32 | 0.30 | 0.31 | 0.000 |
| Comparative Example 2 | 0.31 | 0.32 | 0.50 | 0.42 | 0.046 |
| Comparative Example 4 | 0.31 | 0.32 | 0.50 | 0.42 | 0.046 |

TABLE 3

| | Back light source | | Black matrix | | |
|---|---|---|---|---|---|
| | $x_o$ | $y_o$ | x | y | $(x_o - x)^2 + (y_o - y)^2$ |
| Example 1 | 0.34 | 0.37 | 0.35 | 0.42 | 0.003 |
| Example 2 | 0.34 | 0.37 | 0.36 | 0.36 | 0.001 |
| Example 3 | 0.34 | 0.37 | 0.36 | 0.36 | 0.001 |
| Example 4 | 0.34 | 0.37 | 0.37 | 0.37 | 0.001 |
| Example 5 | 0.34 | 0.37 | 0.35 | 0.42 | 0.003 |
| Example 6 | 0.34 | 0.37 | 0.36 | 0.36 | 0.001 |
| Example 7 | 0.34 | 0.37 | 0.36 | 0.36 | 0.001 |
| Comparative Example 2 | 0.34 | 0.37 | 0.49 | 0.44 | 0.027 |
| Comparative Example 4 | 0.34 | 0.37 | 0.49 | 0.44 | 0.027 |

TABLE 4

| | Transmittance at main wavelengths of back light (%) | | | Ratio of transmittances |
|---|---|---|---|---|
| | 440–460 nm | 530–560 nm | 600–620 nm | (max/min) |
| Example 1 | 0.25 | 0.44 | 0.23 | 1.9 |
| Example 2 | 0.32 | 0.32 | 0.38 | 1.2 |
| Example 3 | 0.32 | 0.38 | 0.38 | 1.2 |
| Example 4 | 0.025 | 0.025 | 0.033 | 1.3 |
| Example 5 | 0.25 | 0.44 | 0.23 | 1.9 |
| Example 6 | 0.32 | 0.32 | 0.38 | 1.2 |
| Example 7 | 0.32 | 0.38 | 0.38 | 1.2 |
| Comparative Example 2 | 0.05 | 0.30 | 0.50 | 10 |
| Comparative Example 2 | 0.05 | 0.30 | 0.50 | 10 |

TABLE 5

| | C light Source | | Black Paste | | | |
|---|---|---|---|---|---|---|
| | $x_o$ | $y_o$ | y | x | y | $(x_o - x)^2 + (y_o - y)^2$ |
| Example 1 | 0.31 | 0.32 | 0.28 | 0.32 | 0.37 | 0.003 |
| Example 2 | 0.31 | 0.32 | 0.25 | 0.31 | 0.31 | 0.000 |
| Example 3 | 0.31 | 0.32 | 0.22 | 0.30 | 0.31 | 0.000 |
| Example 5 | 0.31 | 0.32 | 0.28 | 0.32 | 0.37 | 0.003 |
| Example 6 | 0.31 | 0.32 | 0.25 | 0.31 | 0.31 | 0.000 |
| Example 7 | 0.31 | 0.32 | 0.22 | 0.30 | 0.31 | 0.000 |
| Comparative Example 2 | 0.31 | 0.32 | 0.30 | 0.50 | 0.42 | 0.046 |
| Comparative Example 4 | 0.31 | 0.32 | 0.30 | 0.50 | 0.42 | 0.046 |

What is claimed:

1. A resin black matrix with a light-shading agent dispersed in a resin, comprising the use of carbon black satisfying at least one of the following features of (A) to (D):
   (A) 6.5 to 1.0 in pH
   (B) 0.001<[COOH] in the carboxyl group concentration [COOH] on the surface, as a molar ratio per all carbon atoms
   (C) 0.001<[OH] in the hydroxyl group concentration [OH] on the surface, as a molar ratio per all carbon atoms or
   (D) 0.001<[SO$_3$H] in the sulfonic acid group concentration [SO$_3$H] on the surface, as a molar ratio per all carbon atoms.

2. A resin black matrix or a black paste according to claim 1, wherein said light-shading agent is 5 to 40 nm in average primary particle diameter.

3. A resin black matrix according to claim 1, wherein said light-shading agent is 5 to 100 nm in average secondary particle diameter.

4. A resin black matrix according to claim 1, wherein said light-shading agent comprises carbon black and a pigment of additive complementary color to said carbon black.

5. A resin black matrix according to claim 4, wherein the pigment of additive complementary color to said carbon black is blue and/or violet.

6. A resin black matrix according to claim 1, wherein the amount of the carbon black is 50 wt. % or more of the light-shading agent.

7. A resin black matrix according to claim 1, wherein said resin is a polyimide resin.

8. A black paste with a light-shading agent dispersed in a resin or its precursor solution, comprising the use of carbon black satisfying at least one of the following features of (A) to (D):

(A) 6.5 to 1.0 in pH (B) 0.001<[COOH] in the carboxyl group concentration [COOH] on the surface, as a molar ratio per all carbon atoms (C) 0.001<[OH] in the hydroxyl group concentration [OH] on the surface, as a molar ratio per all carbon atoms or (D) 0.001<[SO$_3$H] in the sulfonic acid group concentration [SO$_3$H] on the surface, as a molar ratio per all carbon atoms.

9. A black paste according to claim 8, wherein said light-shading agent is 5 to 40 nm in average primary particle diameter.

10. A black paste according to claim 8, wherein said light-shading agent is 5 to 100 nm in average secondary particle diameter.

11. A black paste according to claim 8, wherein said light-shading agent comprises carbon black and a pigment of additive complementary color to said carbon black.

12. A black paste according to claim 11, wherein the pigment of additive complementary color to said carbon black is blue and/or violet.

13. A black paste according to claim 8, wherein the amount of the carbon black is 50 wt. % or more of the light-shading agent.

14. A black paste according to claim 8, wherein said precursor solution is a polyimide precursor solution.

15. A black paste according to claim 8, wherein the black paste comprises an amide based polar solvent selected from the group consisting of N-methyl-2-pyrrolidone, dimethylformamide and dimethylacetamide as the main component of the solvent.

16. A black paste according to claim 8, wherein the paste comprises a lactone based solvent.

17. A black paste according to claim 8, wherein the paste comprises an ether acetate of ethylene glycol or an ether acetate of propylene glycol as a solvent, which solvent has 26 to 33 dynes/cm in surface tension.

18. A black paste according to claim 8, wherein the yield value obtained by Casson's flow equation is 0.1 Pa or less.

19. A black paste according to claim 8, wherein its viscosity is 5 to 1,000 cp.

20. A color filter having the resin black matrix according to claim 1.

21. A liquid crystal display device having the color filter according to claim 20.

* * * * *